(12) United States Patent
Hughes et al.

(10) Patent No.: US 6,512,744 B1
(45) Date of Patent: Jan. 28, 2003

(54) VIRTUAL-CHANNEL MERGING

(75) Inventors: David A. Hughes, Mountain View, CA (US); Bruce S. Davie, Belmont, MA (US); Jeremy Lawrence, Newtown (AU)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/344,087

(22) Filed: Jun. 25, 1999

(51) Int. Cl.$^7$ .......................... G01R 31/08; H04L 12/54
(52) U.S. Cl. .................. 370/232; 370/236.1; 370/397; 370/401; 370/429
(58) Field of Search ................................ 370/428, 429, 370/236.1, 395.1, 402, 236.2, 395.53, 397, 395.31, 232, 231, 401

(56) References Cited

U.S. PATENT DOCUMENTS 6,233,243 B1 * 5/2001 Ganmukhi et al. ......... 370/412
6,430,155 B1 * 8/2002 Davie et al. ................ 370/232

FOREIGN PATENT DOCUMENTS

DE 0 730 390 A2 * 4/1996 ........... H04Q/11/04

OTHER PUBLICATIONS

ATM Forum Traffic Management Specification Version 4.0, Apr. 1996.*
Kalyaranaman et al., "Performance and Buffering Requirements of Internet Protocols over ATM ABR and UBR Services," IEEE Communications Magazine, vol. 36, No. 6, Jun. 1998.
C.M.D. Pazos, M. Gerla, and G. Rigolio, "Flow Control and Bandwidth Management in Next Generation Internets," Proceedings of ICATM '98, Colmar, France, Jun. 1998.

* cited by examiner

Primary Examiner—Seema S. Rao
Assistant Examiner—Melanie Jagannathan
(74) Attorney, Agent, or Firm—Cesari and McKenna, LLP

(57) ABSTRACT

A merging ATM switch forwards to a common downstream ATM switch ATM data cells that it receives from a plurality of upstream ATM switches. The merging ATM switch may have different upstream ATM switches employ different respective virtual-circuit identifiers for those commonly destined data cells, but it uses a common virtual-circuit identifier in forwarding them to the downstream switch. The upstream ATM switches intersperse among the data cells forward-directed resource-management cells bearing the virtual-channel identifiers that those upstream switches use on the commonly destined data cells. The merging ATM switch responds to such forward-directed resource-management cells by sending corresponding forward-directed resource-management cells to the downstream ATM switch and reverse-directed resource-management cells to the upstream ATM switches. The forward-directed resource-management cells sent to the downstream ATM switch bear the common virtual-circuit identifier, whereas the reverse-directed resource-management cells sent to the upstream ATM switches bear the respective virtual-circuit identifiers that those upstream ATM switches placed in the forward-directed resource-management cells. By so doing, the merging switch avoids the ambiguity that resource-management-cell forwarding other-wise entails.

23 Claims, 10 Drawing Sheets

VIRTUAL-CHANNEL MERGING

CROSS REFERENCE TO RELATED APPLICATION

This patent application is related to U.S. patent application Ser. No. 09/201,337, which was filed on Nov. 30, 1998, now U.S. Pat. No. 6,430,155 by Davie et al. for Congestion Avoidance on Communications Networks.

BACKGROUND OF THE INVENTION

The present invention is directed to communications networks. It particularly concerns congestion avoidance.

Internetwork communications are based on operations of routers, which are network devices that determine, on the basis of destination information in packets that they receive, where to forward the packets so that they are likely to reach the intended destinations.

Router configurations vary widely, but that of FIG. 1 is typical. Router 10 includes a plurality of communications interfaces 12, 14, and 16, which send and receive communications packets to and from remote locations. When one of the interface modules receives an incoming packet from a remote location, it places header information from that packet onto an internal communications bus 18 by which it communicates with a forwarding engine 20 that determines where the packet should be sent. The interfaces and forwarding engine can be implemented in respective high-performance processors 21 and storage circuitry 22 that contains program instructions that configure the processors to act together as a router. The programming for such implementations is typically provided in some type of persistent medium, such as a magnetic disk or semiconductor read-only memory. That type of implementation most often executes that programming after it has been transferred to a volatile medium, such as dynamic or static random-access memory. The drawing shows the storage circuitry 22 as separate media for each interface or forwarding engine, but some configurations may additionally, or instead, employ common storage. In some cases the router's programming may be updated remotely by sending it electrical or other signals that represent the instructions.

To maximize speed capacity, other routers are implemented wholly or largely in "random logic" instead of general-purpose processors. The "programming" in such implementations is ordinarily hard-coded in the circuitry's structure, but read-only or read/write storage media may be employed in such implementations, too, to affect the router's behavior. Once the decision has been made, an output packet is formed from the input packet by packet-assembly circuitry that may reside in one or more of the interface modules and/or the forwarding engine, and the forwarding engine causes another interface to send the output packet to a further remote location.

Some routers may actually be implemented in switches that employ the Asynchronous Transfer Mode (ATM) protocol. Such switches operate in the manner that FIG. 2 depicts. Suppose that one of router 10's ATM interfaces provides communication with another router 24, while a different ATM interface provides communication with a further router 26. Suppose further that router 10 is an "edge router" of an internet-service provider: although it is part of a network that is maintained by the service provider, it has direct links to client routers such as router 26, which are outside the service-provider network.

Router 26 sends information in packets to router 10, and we will assume for present purposes that the packets sent by router 26 conform to the Internet Protocol (IP). In accordance with that protocol, each packet begins with a header that includes, among other information, an address that indicates the host system to which the packet should ultimately be routed. Router 10 includes storage circuitry containing a routing table that tells the router the direction in which to send the packet so that it will reach the destination set forth in the IP header.

Now, the service provider must of necessity base its initial routing decision on the incoming packet's destination address. But IP addressing makes doing so in the conventional manner a relatively time-consuming process. An IP address is typically 32 bits long: it could theoretically distinguish over four billion host systems. Although the number of host systems that have globally unique IP addresses is much smaller than this, the actual number of such systems is considerably greater than the number of entries it is practical for an individual router's forwarding table to include.

Many of the forwarding table's entries therefore are directed not to a single host address but rather to a "prefix" of fewer than the thirty-two bits. Such an entry indicates that the forwarding information contained in it can be used to reach any destination address that begins with the prefix to which the entry is directed. Prefixes vary in length, the longest being the most specific and thus presumably representing the best routes to the included host addresses. So a router that receives an IP packet searches through its forwarding table to find the longest prefix that matches the incoming packet's destination address, and it forwards the packet in accordance with the information thus found.

Such longest-match searches are time-consuming. But an Internet-service provider's "transit" routers, i.e., those that are not edge routers, can avoid such an expensive longest-match search if they forward the packets in ATM "cells." An ATM cell includes a "virtual-channel identifier," which identifies the receiving router's forwarding-table entry that contains the forwarding information for the "virtual channel" along which the cell is to be forwarded. For this purpose, an edge router such as router 10 works with other routers to set up a virtual channel within the service-provider network before it forwards the first packet to a particular destination. That is, successive routers determine the path through the network that such packets should take, and they tell each other where in their respective forwarding tables they keep forwarding information for that virtual circuit.

FIG. 3 depicts the format that ATM switches use to send information over the resultant virtual channel. From the point of view of an ATM client, the frame that FIG. 3's third row depicts is the basic transmission unit. (Those skilled in the art will recognize that there are also other possible ATM frame formats, but FIG. 6's third row depicts one, known as "AAL5," that would typically be employed for user data.) Since the service-provider network is being used to forward IP datagrams from router 26, that drawing's fourth row depicts the frame's payload as an IP datagram having the usual IP header and IP data.

From the point of view of such an ATM switch, though, the (variable-length) third-row frame is not the basic transmission unit. Specifically, the edge router divides that frame into pieces that it forwards in a plurality of equal-sized cells. As FIG. 3's second row shows, an ATM cell consists of a cell payload and header. FIG. 3's first row depicts the cell's header format and shows that it includes a PTI field. One purpose of the PTI field is to indicate whether the cell containing it is the last one in a frame. If it is, then the cell's last eight bytes form the frame trailer field depicted in FIG. 3's third row. Among other things, the trailer indicates how much of the preceding cell's contents is not actual frame payload but instead is fill used to pad the cell to the predetermined ATM cell size.

The header field of particular interest here is the VPI/VCI field. Each switch associates a virtual path or virtual channel with a virtual-path or virtual-channel identifier of local significance to that switch: it indicates the forwarding-table entry from which the switch is to fetch forwarding information for the cell being forwarded. Part of that entry's information is a replacement for the incoming cell's virtual-path or virtual-channel identifier. The replacement specifies the virtual path or virtual channel's correct entry in the forwarding table of the "next-hop" switch, to which the current switch's forwarding-table entry directs that the cell be sent.

Suppose that the client router 26 of FIG. 2 sends edge router 10 a packet whose IP destination address is $D_1$. Also suppose that a further client router 28 provides access to that destination. The service-provider router having a direct link to client router 28 is router 30. To forward the packet properly, the provider network sets up an ATM virtual path from router 10 through routers 24 and 32 to router 30. Router 10 then divides packets specifying destination $D_1$ into ATM cells, and it places into each such cell's header the virtual-path identifier $V_1$ that router 10 learned during the virtual-channel-establishment process was the location in router 24's forwarding table where router 24 stored the proper forwarding information for the virtual channel to router 30. So router 24 does not need to perform a longest-match search when it receives such cells: it goes directly to the table entry that virtual-path identifier $V_1$ specifies, and that entry tells it both the interface over which to forward the cell and the virtual-channel identifier $V_2$ with which it should replace the incoming cell's virtual-channel identifier $V_1$.

Similarly, router 32 employs virtual-channel identifier $V_2$ to find its forwarding-table entry for that virtual channel. That entry tells router 32 to forward the cell over its interface with the link to router 30 and to place the value $V_3$ into that cell's VPI/VCI field. Since router 30 is an edge router and must forward the packet to a non-ATM router 28, it assembles the IP-packet-containing frame from its constituent cells and forwards that IP packet, which still contains its destination address $D_1$, to client router 28.

A similar sequence of events occurs when another customer router 34 sends an IP datagram containing destination address $D_1$ to another edge router 36. As before, each of the routers along the service provider's path toward destination D, allocates a virtual-channel identifier to that virtual channel. Edge router 36 encapsulates the datagram in an ATM frame and divides the frame into fixed-length cells whose virtual-channel identifier is, say, $V_4$. Subsequent routers 40 and 32 forward such cells, replacing their virtual-channel identifiers with values $V_5$ and $V_6$, respectively. And, as before, the egress edge router 30 re-assembles the IP datagram and sends it to the customer router 28 that can forward it on to its ultimate destination.

Note that routers 30 and 32 in this scenario allocate two different virtual-channel identifiers to a common-destination path; they do not "merge" the channels by assigning a common virtual-channel identifier. This scenario is typical, even though virtual-channel identifiers are a relatively scarce resource in ATM switches.

SUMMARY OF THE INVENTION

We have recognized that a principal impediment to merging virtual channels, and thus conserving the virtual-channel-identifier space, can be eliminated by simply employing a feature that many ATM switches already provide in other contexts in order to shorten congestion-avoidance control loops.

To avoid congestion, many ATM systems employ an available-bit-rate (ABR) mechanism. In accordance with this mechanism, an ingress ATM switch that sends data into a particular virtual channel intersperses so-called resource-management cells among the data cells sent into that virtual channel. Unlike data cells, a resource-management cell travels not only in one direction along the virtual channel but also back again to the ingress switch that initially created it.

When the ingress router creates the resource-management cell, it includes an "explicit-rate" value in it. The explicit-rate value specifies the rate at which it proposes to send cells into that virtual channel. As the resource-management cell traverses the virtual channel, the virtual channel's routers determine whether they can sustain the rate that the resource-management cell's explicit-rate value specifies. If not, they reduce the explicit-rate entry to a value that they can sustain. So the returned resource-management cell tells the ingress router a rate at which it can transmit cells into that virtual channel without overwhelming any of that virtual channel's routers.

This resource-management-cell use has been an impediment to virtual-channel merging, since resource-management cells must traverse the virtual channel in the reverse direction as well as in the forward direction, and virtual-channel-indicator swapping at the merge eliminates information that would identify the resource-management cell's source; the reverse-directed cell has nothing in it to identify the constituent channel into which the merging router should direct that cell. But we have recognized that a solution to this problem can be provided by using a mechanism that many ATM switches use to shorten the control loops that lengthy virtual channels represent.

Specifically, one or more ATM switches in the midst of a long virtual channel can act as "virtual destinations" and "virtual sources." That is, rather than forwarding a resource-management cell to the next router in the virtual channel, a switch acting as a virtual destination sends it back toward the source. The source switch also acts as a virtual source by sending another resource-management cell in the forward direction to the next switch in the virtual channel.

In accordance with our invention, an ATM switch merges constituent virtual channels but acts as a virtual destination/virtual source for those virtual channels' resource-management cells. In this way, no merge occurs in the part of a virtual channel that any individual resource-management cell traverses, so the available-bit-rate mechanism is no longer an impediment to virtual-channel merging. This invention is applicable not only to ATM-implemented networks but also label-switching networks implemented in other technologies.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
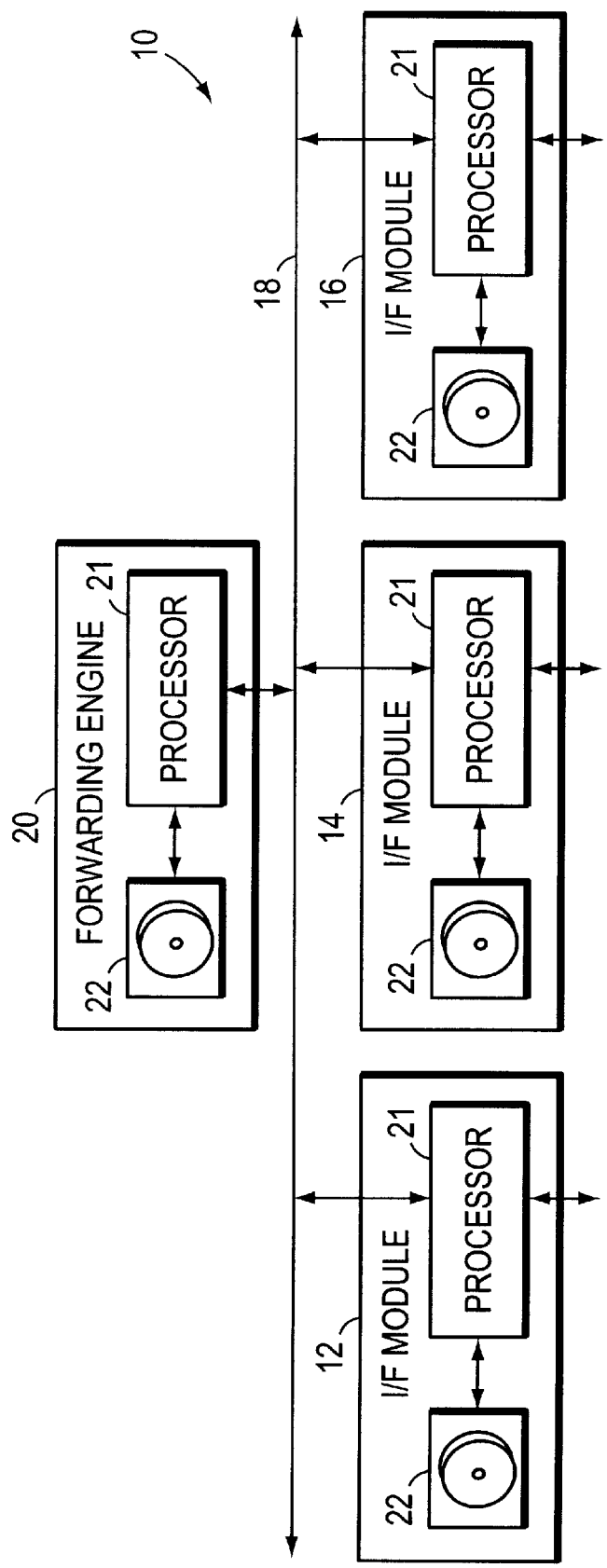
FIG. 1, discussed above, is a block diagram of a router of the type in which the present invention's teachings can be employed.
Figure 2:
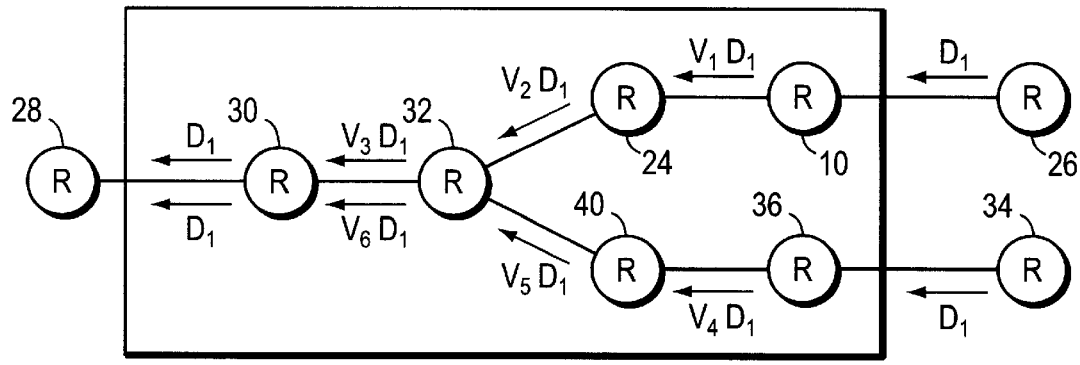
FIG. 2, described above, is a block diagram illustrating the topology of a typical local network that includes such routers.
Figure 4:
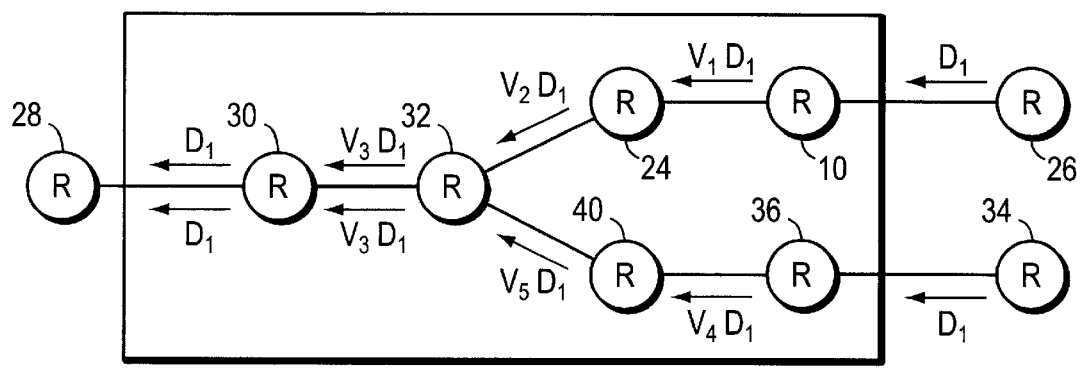
FIG. 4 is a diagram similar to FIG. 2 but illustrating virtual-channel merging.
Figure 3:
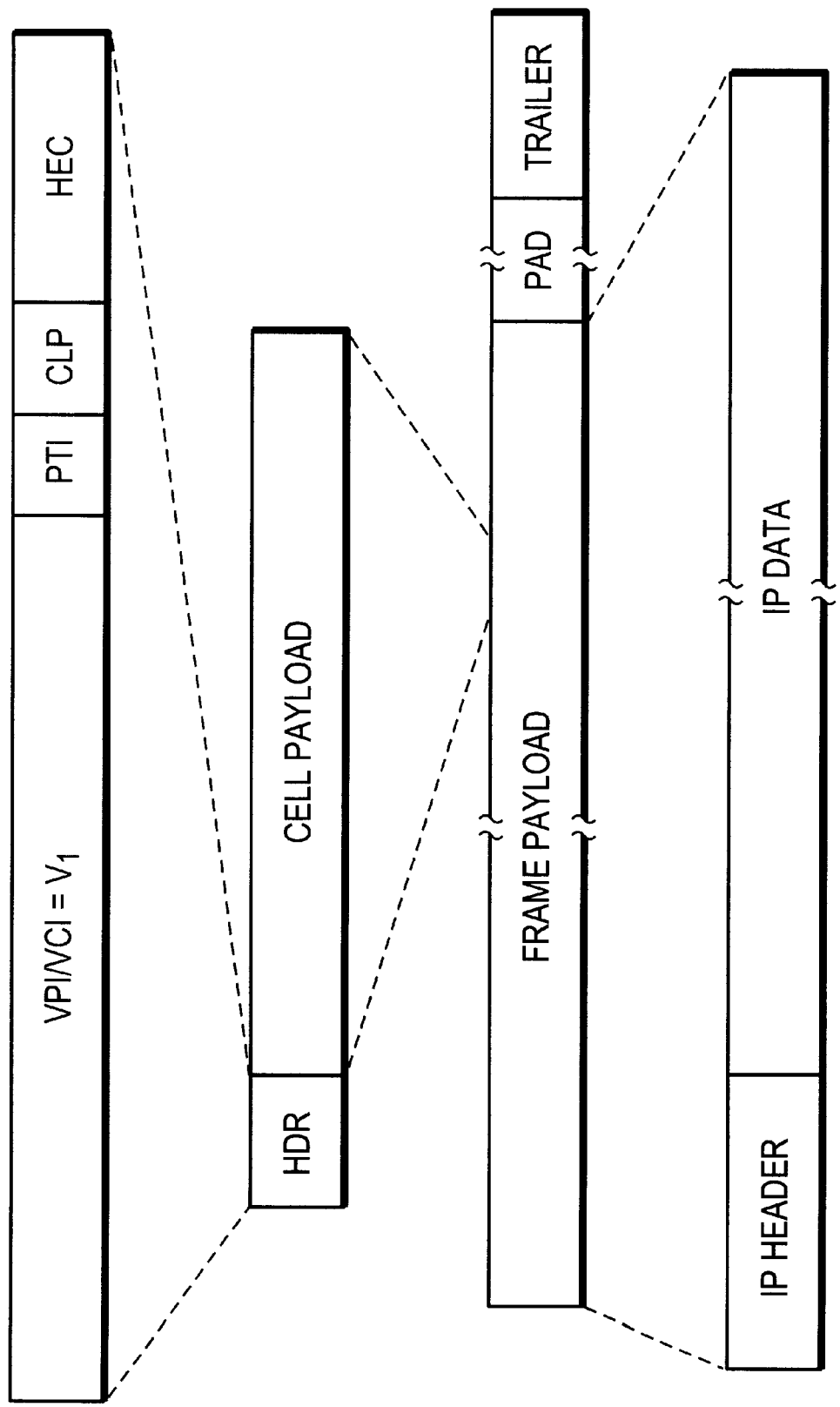
FIG. 3, discussed above, is a diagram of an ATM cell used to carry an IP datagram.

FIG. 4 is a diagram similar to FIG. 2, but FIG. 4 illustrates the behavior of an ATM system that merges virtual channels. As before, switch 32 receives $D_1$-destined cells from different sources. In setting up the virtual channels, though, switch 32 has not asked switch 30 to give it different virtual-channel identifiers for the same destination. So the contents of the replacement-virtual-channel-identifier fields in its $V_2$ and its $V_5$ forwarding-table entries are the same, namely, $V_3$. And switch 30 can therefore conserve virtual-channel-identifier space.

Although it will be apparent as the description proceeds that the present invention's teachings can be applied to a more-conventional ATM system, we prefer to practice them in systems in which the ATM switches implement so-called label-switching routers. Such routers employ IP-related routing mechanisms but additionally use "labels," which are similar to the virtual-channel identifiers that ATM systems use.

To understand how such systems operate, it helps to review certain aspects of conventional IP operation. For the sake of example, let us consider an IP datagram transmitted on a shared-medium link occupied by, among other nodes, two routers involved in forwarding the packet. To specify that the intended receiving router rather than some other node is to receive the packet, the IP datagram 44 in FIG. 5's second row is encapsulated in a link-layer frame, which FIG. 5 depicts as including an Ethernet-format header 46.

Header 46's destination-address field identifies the receiving router's interface on that link. The receiving router recognizes its destination address and therefore does not ignore the packet, as other link nodes must. Instead, it consults a de-multiplexing field—typically referred to as a "type" field when the link-layer protocol is of the Ethernet variety—to identify its process to which the link-layer payload should be delivered. In this case, the type field specifies the IP process, i.e., the process employed in routing packets to their ultimate destinations.

Figure 5:
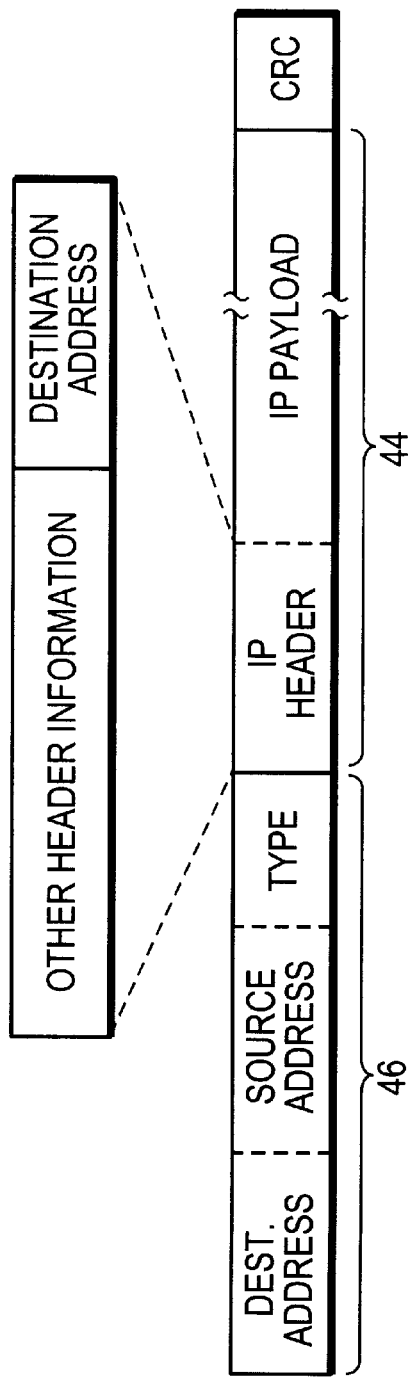
FIG. 5 is a diagram illustrating the format of an IP datagram encapsulated in an Ethernet frame.

The IP process interprets the link-layer payload 44 as an IP datagram, which includes an IP header of the format that FIG. 5's first row depicts. In addition to other information, that header includes a destination-address field, which identifies the host interface to which the IP datagram should ultimately be routed.

The receiving router employs this address to identify the "next-hop" router to which it should send the packet. For this purpose it uses a forwarding table, into which it has distilled information about internetwork topology that it has obtained in various ways, most typically by communications with other routers. Routers inform each other of the host systems to which they can forward communications packets, and they employ such information to populate their forwarding tables.

Now, the IP address is 32 bits long in most versions and even longer in versions that will soon be adopted, so the IP address could theoretically distinguish among over four billion host systems. Actually, the number of host systems that have globally unique IP addresses is much smaller that this, but the number still is considerably greater than the number of entries it is practical for an individual router's forwarding table to include.

The solution to this problem historically has been to base the table look-up on destination-address prefixes. That is, some routers will simply indicate that they can handle traffic to all hosts whose destination addresses begin with a particular, say, 16-bit sequence, or "prefix." Additionally, a router may compact its information so as to store routes in this form.

Prefixes vary in length, the longest being the most specific and thus presumably representing the best routes to the included host addresses. So a router searches through the prefix entries in its forwarding table to find the longest prefix that matches an incoming packet's destination address. When it finds the table entry containing that prefix, it reads that entry's fields that specify the interface over which it should forward the packet and the link-layer address of the router to which the interface should send the packet for further forwarding.

Although this approach has proved quite serviceable and robust, it has exhibited shortcomings that have led some workers to propose a table-index-based forwarding method for high-speed networks such as those of some Internet-service provider ("ISPs") . Specifically, routers would inform their neighbor routers of the locations within their tables at which they have stored information associated with particular prefixes. When their neighbors send them packets destined for hosts whose addresses begin with those prefixes, they insert a "shim" between the link-layer header (such as an Ethernet header) and the network-layer header (typically, an IP header).

This shim's contents include a label. A label is like a destination address in that it is a route indicator. Instead of specifying the ultimate destination's network-layer address directly, though, the label serves as an index to the desired route in the receiving router's forwarding table: the label's function is like a virtual-channel identifier's. (Workers in this art currently use the term tag interchangeably with the term label in this context, and we will do so below.)

One of this approach's advantages is that it relieves the receiving router of the need to perform an expensive longest-match search: the label leads the receiving router directly to the correct forwarding-table entry. More important, it affords ISPs the opportunity to have their ingress routers (which receive packets from outside the service-provider network) specify the egress routers by which received packets should issue from the network. This frees the ISP's interior ("transit") routers of the need to participate in forwarding policy and maintain the associated information bases. Commonly assigned co-pending U.S. patent application Ser. No. 08/997,343, filed on Dec. 23, 1997, by Rekhter et al. for Peer-Model Support for Virtual Private Networks with Potentially Overlapping Addresses, describes in detail one proposal, known as Multiple-Protocol Label Switching ("MPLS") , for employing such shims. We hereby incorporate that application in its entirety by reference.

To appreciate MPLS's general approach, temporarily assume that the switches in the service-provider network of FIGS. 2 and 4 are non-ATM label-switching routers and that a conventional customer IP router 26 forwards a packet to ingress router 10. The link-layer packet's payload consists of an IP datagram, including the datagram's payload data and a header that gives the ultimate destination's (network-layer) address as $D_1$. The ISP needs to perform its routing rapidly, so it employs the label switching just described.

Edge routers such as router 10 tell each other the address prefixes of hosts outside the provider network to which they can forward packets. Because of this communication, ingress router 10's forwarding database indicates that packets having a prefix that matches address $D_1$ should be sent to router 30 for forwarding outside the service-provider network: for such routes, router 30 is the egress router. When router 10 receives the $D_1$-destined packet from customer router 26, it finds this information in its database through a conventional longest-match search.

Since the egress router 30 is not the ingress router 10's immediate neighbor, router 10 additionally looked up forwarding information for router 30 when it installed the forwarding-table entry for the route to the $D_1$-including prefix, and it found that packets destined for router 30 should be sent to neighbor router 24 for forwarding. We assume that it had additionally received from router 24 a request that packets sent to router 24 for forwarding to egress router 32 should be labeled with label $V_1$. So router 10 includes label $V_1$ in an MPLS header that it prepends to the incoming packet's datagram. That label is router 24's forwarding-table index to information for forwarding packets toward router 30. For the sake of example, FIG. 6's first row shows the MPLS header as encapsulated in an Ethernet (link-layer) header and trailer, and that header's type field in this case specifies that the link-layer payload should be delivered to the receiving node's MPLS process.

Figure 6:
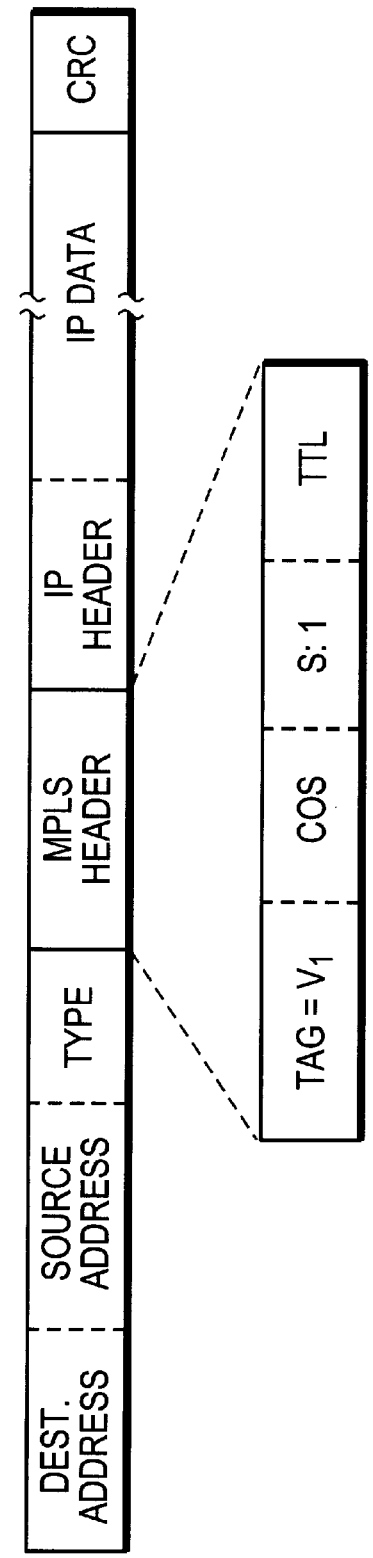
FIG. 6 is a diagram illustrating the format of a packet that a label-switching router may receive and/or forward over an Ethernet link.

That process interprets the MPLS header as FIG. 6's second row illustrates. The MPLS header is arranged as a stack of one or more stack entries, each of which contains a label. In this example, only one label is required. Each stack entry includes the label field itself as well as further fields. One such field is an end-of-stack ("S") field. That field consists of one bit, which indicates whether the stack entry is the bottom entry in the tag stack. The end-of-stack field's value is zero for all stack entries except the last, or "bottom" one. In this example, there is only one stack entry, so its stack bit is one.

Neighbor router 24 rapidly finds forwarding information for the received packet because the label entry in the shim header contains the label $V_1$ that identifies router 24's correct forwarding-table entry for the route to egress router 30. Included in that table entry's information is the value of the label that the next router 32 has asked to be placed in packets sent to it for forwarding to the egress router 30. Router 24 accordingly replaces the received packet's tag-field contents with the label, $V_2$, that router 32 has advertised. Finally, router 32 sends the packet to the egress router 30, replacing label $V_2$ with a label $V_3$ advertised by router 30.

Since $V_3$ indicates that the packet is to be delivered to router 30, that router looks into the packet to read the destination address D1 and thereby determine how further to deal with the packet. Previously, router 30 had determined that packets destined for the prefix including D1 should be passed to customer router 28. It may have been programmed with this information, or it may have determined it by other means. Guided by this information, router 30 forwards the packet to router 28. In doing so, it removes the shim header because customer router 28 does not employ label switching.

Figure 7:
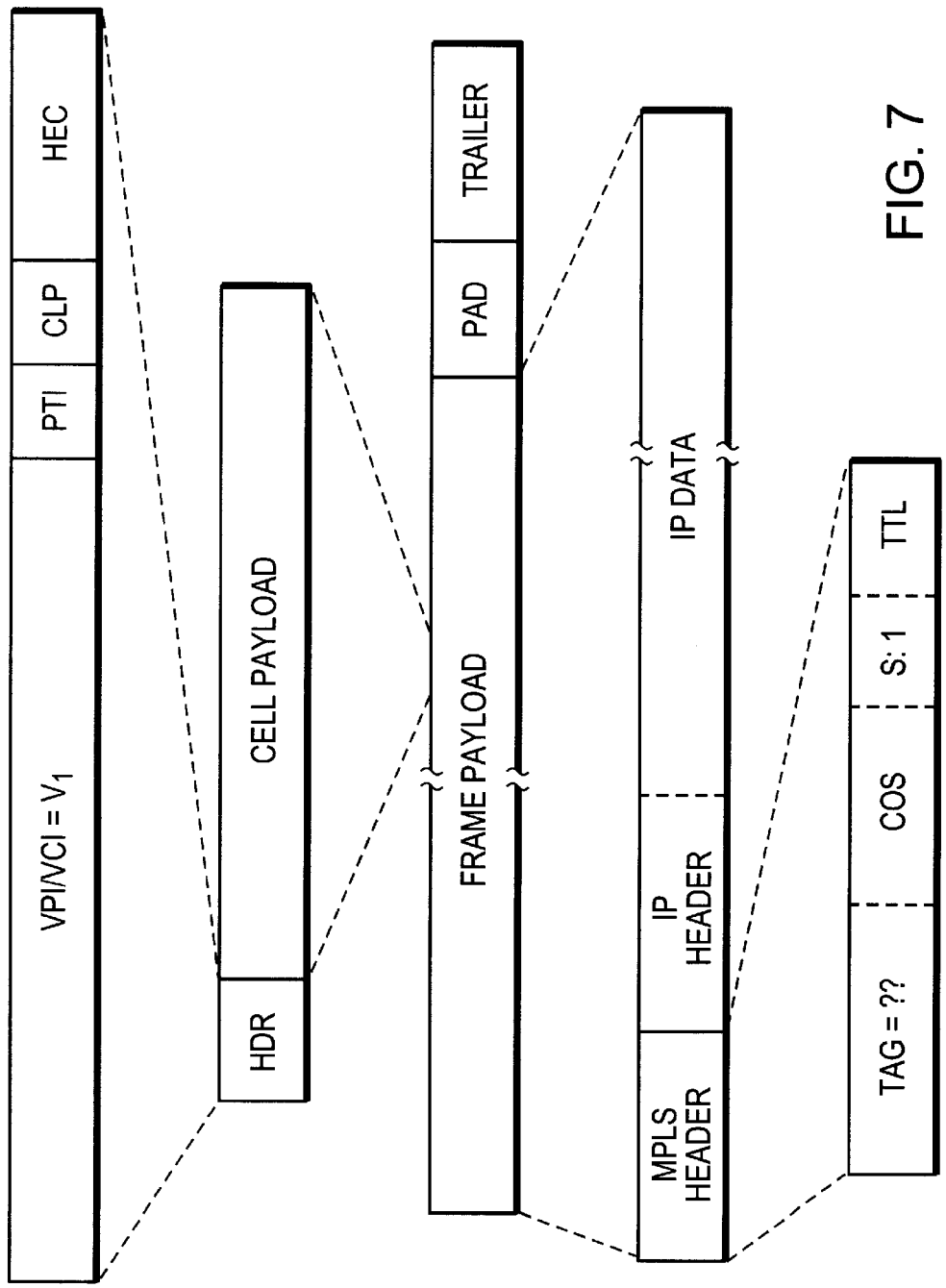
FIG. 7 is a diagram illustrating the format of a packet that an ATM-implemented label-switching router may receive and/or forward.

Although the link-layer and network-layer protocols in the FIG. 5 example are Ethernet and IP, respectively, ATM, too, can support label use, as FIG. 7 illustrates. FIG. 7's third row depicts an ATM frame, and its fourth and fifth rows show that the frame's payload is similar to the IP datagram and MPLS header that FIG. 6's Ethernet header and trailer encapsulate. The only difference is that FIG. 7's fifth row represents the (top) tag by question marks. The question marks indicate that the top tag does not matter; routing decisions that, say, FIG. 2's router 24 bases on the top tag when that router is implemented as an IP router are instead based, as was explained above, on an ATM VPI/VCI field in the ATM cell's header when the ISP's routers are implemented as ATM switches.

We now turn to the present invention's teachings, which will be exemplified in an ATM-implemented label-switching system of the type discussed above, although it will be apparent that the invention's applicability is not so limited.

Figure 8:
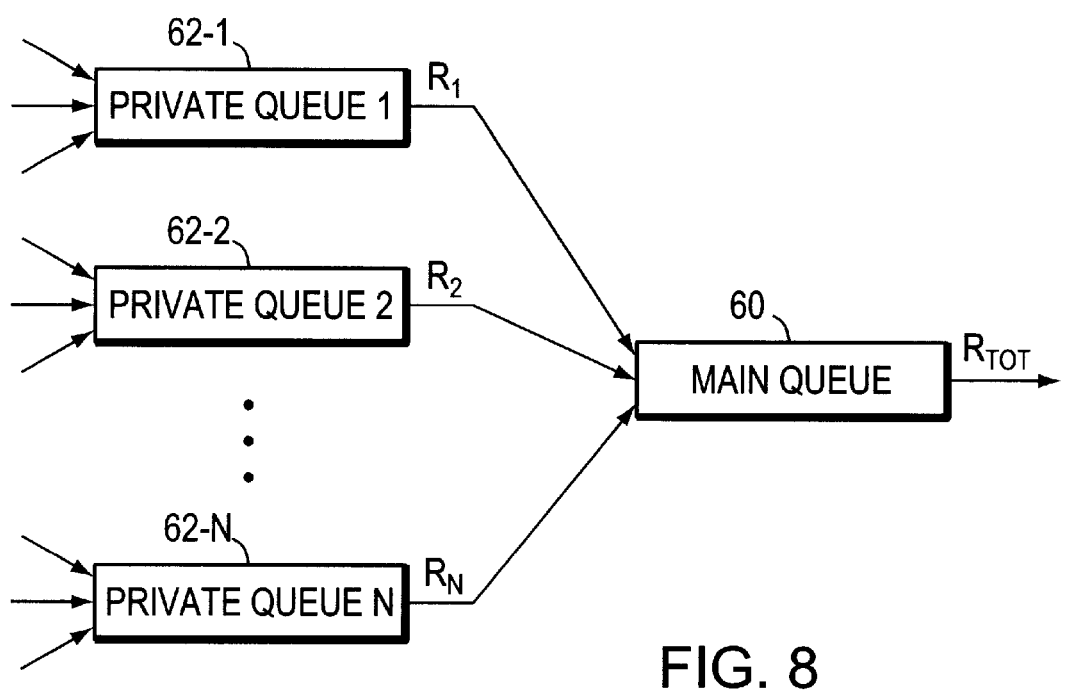
FIG. 8 is a diagram illustrating a general cell-queuing approach that a router may employ.

The present invention's teachings are directed to congestion avoidance. Each of a router's interfaces has speed limitations: it cannot transmit more than a maximum number of bytes per second. This maximum is the total of all of the data that it forwards. FIG. 8 represents this aspect of the interface's operation. The router maintains a queue 60 of packets (e.g., ATM cells) that the router has assigned to that particular interface for forwarding. The interface can forward these packets on a first-come, first-served basis, but it is more typical for a router to divide its available bandwidth among the packets in some other way. In the illustrated example, we assume that the division occurs in accordance with the destinations of the packets to be forwarded. In the illustrated, ATM-implemented label-switching environment, this means division by packet label/virtual-channel indicator.

Each label is assigned its own queue, such as queues 62-1, 62-2, . . . , 62-N, each of which receives all of the packets containing a respective label. Also, the queues are assigned respective rates $R_1, R_2, \ldots, R_N$ at which data are read from them into the main queue 60 so that the sum of all of the rates equals a nominal interface output rate $R_{TOT}$. (Actually, the nominal interface output rate $R_{TOT}$ may be allowed to be slightly greater or less than the interface's physical output rate if the main queue is nearly empty or nearly full.) This relationship is based on the tacit assumption that the interface is receiving enough packets to keep it busy at its nominal rate. This is a useful assumption, since operation under such conditions is what necessitates queuing considerations.

But it raises the question, What happens when the interface's queues overflow because it has been receiving more data than it can forward? The simple answer is that it discards packets that it cannot store in a queue. Although reliable transport mechanisms can accommodate such discarding, the system should endeavor to avoid the need for it.

This is the purpose for ATM's available-bit rate ("ABR") congestion-avoidance mechanism, which employs the resource-management messages mentioned above. Such messages are used in the following way. To ensure that the edge router 10 in FIG. 4 is not forwarding so many $V_1$-labeled cells that downstream routers may be overwhelmed, it periodically transmits into the $V_1$-specified channel a cell whose (three-bit) PTI field's value is $110_2$. This identifies it as a resource-management cell, whose format FIG. 9 depicts.

As that drawing's second row indicates, such a cell includes an ER field. The ER contains an "explicit rate," i.e., a rate at which the ingress router proposes to send cells into that channel. As will presently be described in detail, ATM switches forward the resource-management cell along that channel's path and back again. As they do so, each switch determines whether it can handle the explicit rate that the message contains. If it cannot, it reduces the explicit rate to one that it can sustain. So the returned resource-management message's explicit-rate field tells the ingress router 10 how fast it can send cells into that virtual channel without overwhelming downstream routers.

Figure 9:
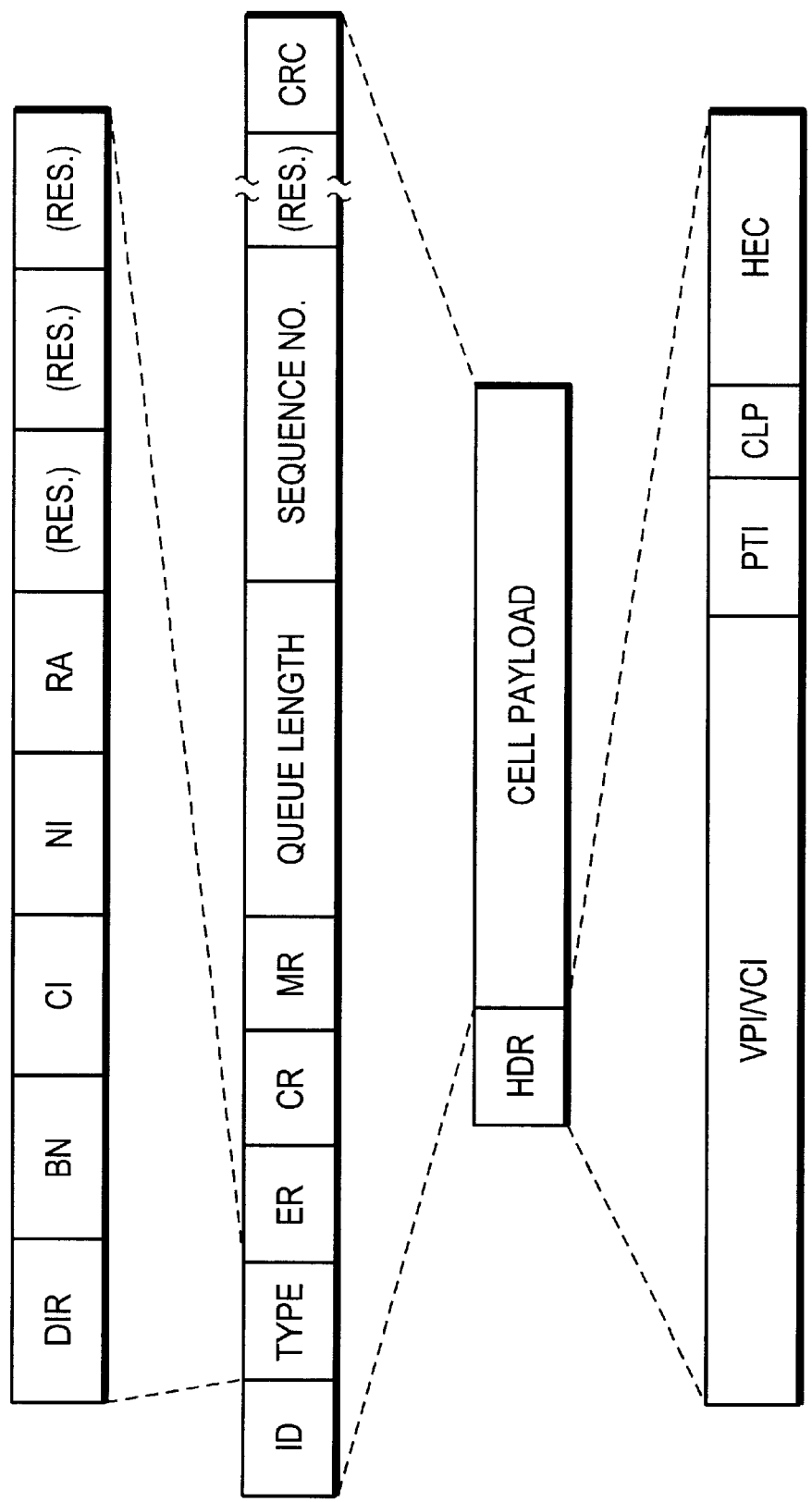
FIG. 9 is a diagram illustrating the format of a resource-management cell that an ATM switch uses to determine the packet rates that it allocates to respective virtual circuits.

Those skilled in this art are familiar with the interpretations that ATM switches give FIG. 9's illustrated fields. So we will refer here to only the type and explicit-rate ("ER") fields of FIG. 9's second row. The ER field contains a floating-point number that specifies the rate, in cells per second, at which an ATM-implemented router requests permission to send cells having the label, say, $V_1$, that the cell's VPI/VCI field contains. (In systems in which some label-switching routers are implemented in ATM switches and others are not, the rate may instead be given in terms of bytes per second, since non-ATM routers do not use ATM cells.)

Edge router 10 places a zero in the type field's DIR field to indicate that this resource-management datagram is of the "forward" type: it is traveling away from its source rather than back to it. Except in merge situations of the type described below, the illustrated embodiment's transit routers such as router 24 normally make no change to forward-type resource-management cells' ER fields. So router 24 ordinarily just replaces the VCI field's value $V_1$ with label $V_2$ and sends the resultant cell to the next transit router 32 without changing the ER-field contents. Router 32 then forwards the resource-management cell to the egress router 30 after replacing $V_2$ with $V_3$.

When the egress router 30 receives the resource-management cell, it reads the cell's VCI field and determines that there is no next hop associated with the label that it contains. That is, router 30 is the end of the virtual channel's path. In this embodiment, that means that the resource-management cell must be turned around. So router 30 sends the resource-management cell back in the direction from which it came, i.e., back to router 32, after changing the DIR contents to a logical one to indicate that the resource-management datagram is of the reverse variety. A reverse resource-management cell's VCI field is an index into the routing table of the resource-management cell's sender, rather than, as in the case of a forward resource-management cell, that of its receiver. In handling a reverse-directed resource-management datagram, a router reduces the ER field if the rate that it contains is not one that the router can sustain. In that way, the resource-management cell tells the service router a rate that will not overwhelm the virtual circuit's routers.

We now turn to the problem presented by router 32's merging virtual circuits. In the FIG. 2 scenario, in which there has been no virtual-circuit merger, router 32's forwarding of a $V_3$-bearing reverse resource-management cell presents no problem; inspection of FIG. 2 makes it clear that router 32 should send such a cell toward router 24 with a VCI value of $V_2$. In the FIG. 4 scenario, though, the conventional approach to resource-management-cell propagation leaves router 32 with no way of telling what the resource-management cell's origin was; it could have been either router 10 or router 36. From router 32's point of view, that is, the returning resource-management cell could have resulted from a resource-management cell that it forwarded in response to a cell from either router 24 or router 40.

According to the present invention, though, router 32 avoids that problem because it departs from the conventional approach to resource-management-cell forwarding. Instead, it acts as a virtual destination and a virtual source. Specifically, if router 32 receives from router 24 a forward resource-management cell whose VCI value is $V_2$ and whose ER value is $ER_{24}$, it responds by emitting two resource-management cells. The first is the one that results from turning the received forward resource-management cell around: it sends router 24 a reverse-direction resource-management cell containing the same virtual-circuit identifier, with its ER value possibly reduced in the manner to be described in more detail below. The other is a forward resource-management cell whose VCI value is $V_3$, i.e., the one it would place in a data cell for the same virtual circuit.

The value that router 32 places in that forward resource-management cell's ER field may differ from implementation to implementation. For example, it may simply be the value, in this case $ER_{24}$, that the incoming resource-management cell contained. But it preferably is the sum of $ER_{24}$ and the ER value, say, $ER_{40}$, that it received in the last resource-management cell from router 40 containing a VCI-field value of $V_3$. In that way, router 32 is effectively asking whether the downstream router has the capacity to receive cells at the sum of the rates that its upstream neighbors have requested.

When router 32 receives the resultant reverse resource-management cell from router 30, it uses that reverse cell's explicit-rate information in the reverse resource-management cells that it sends to both of its upstream-neighbor routers 24 and 40 for the merged virtual circuits. Again, the way in which the merging router arrives at the explicit rate that it places in those resource-management cells may vary from implementation to implementation. One approach is simply to leave the explicit-rate values unchanged (unless the merging router's own capacity imposes a rate limit). Those skilled in the art will recognize that there are methods that the downstream routers can use to reduce the explicit rates they forward under this approach until the data-cell rates they experience decrease to their capacities. Preferably, though, the merging router divides among the upstream routers the explicit rate it receives from the downstream router.

To understand one way of accomplishing this, first consider one example of how reverse-direction resource-management cells' explicit-rate values may be determined in ordinary, non-merged situations. This example involves deciding whether the rate specified by the received cell's ER field is one that the receiving router's interface can sustain for the virtual channel to which the resource-management cell refers. Making that decision in turn requires balancing the rate allocated to that virtual channel with those allocated to other virtual channels that use the same interface.

Figure 10:
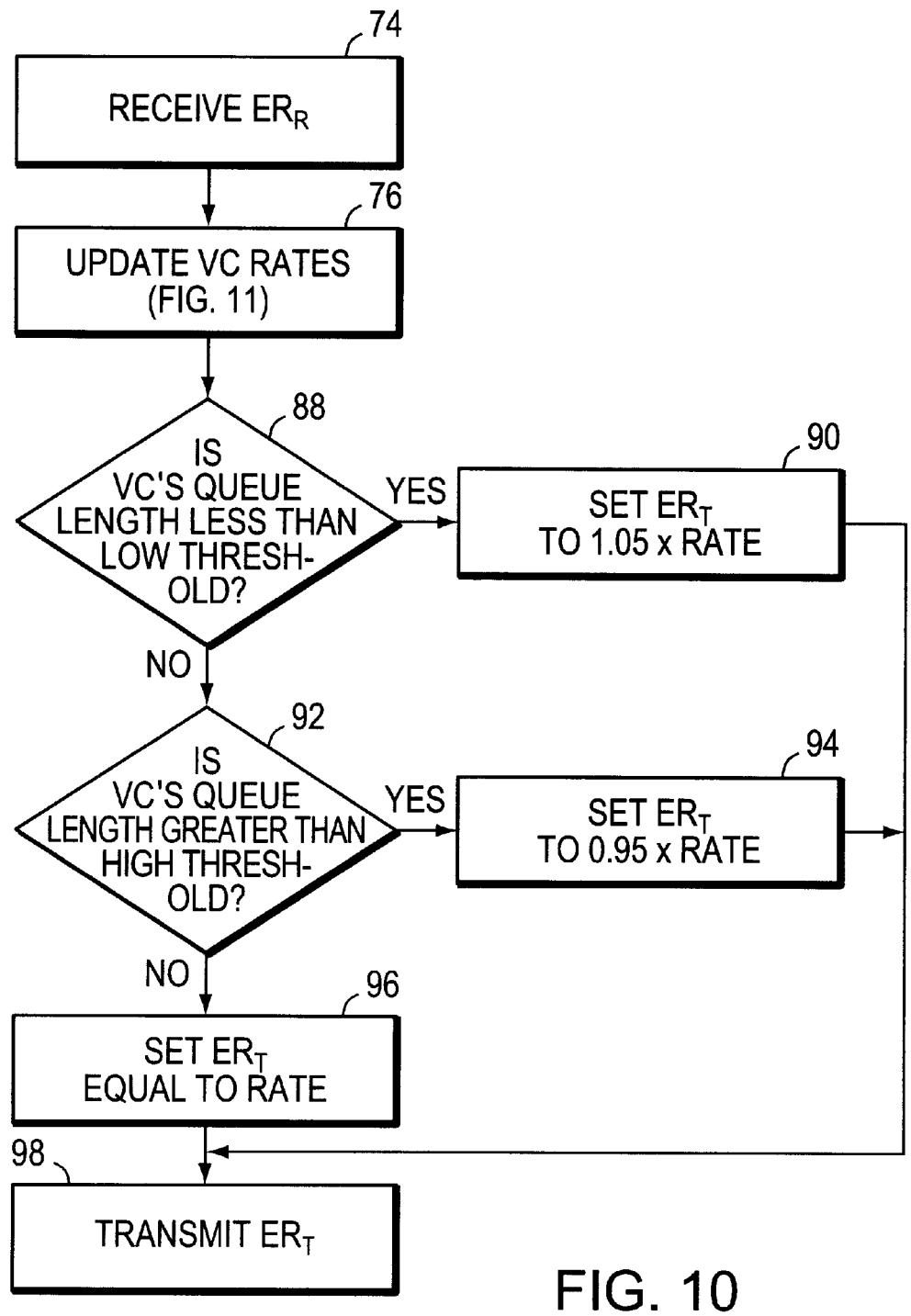
FIG. 10 is a flow chart illustrating the procedure used to determine the ER value that a router places in resource-management cells that it forwards.
Figure 11:
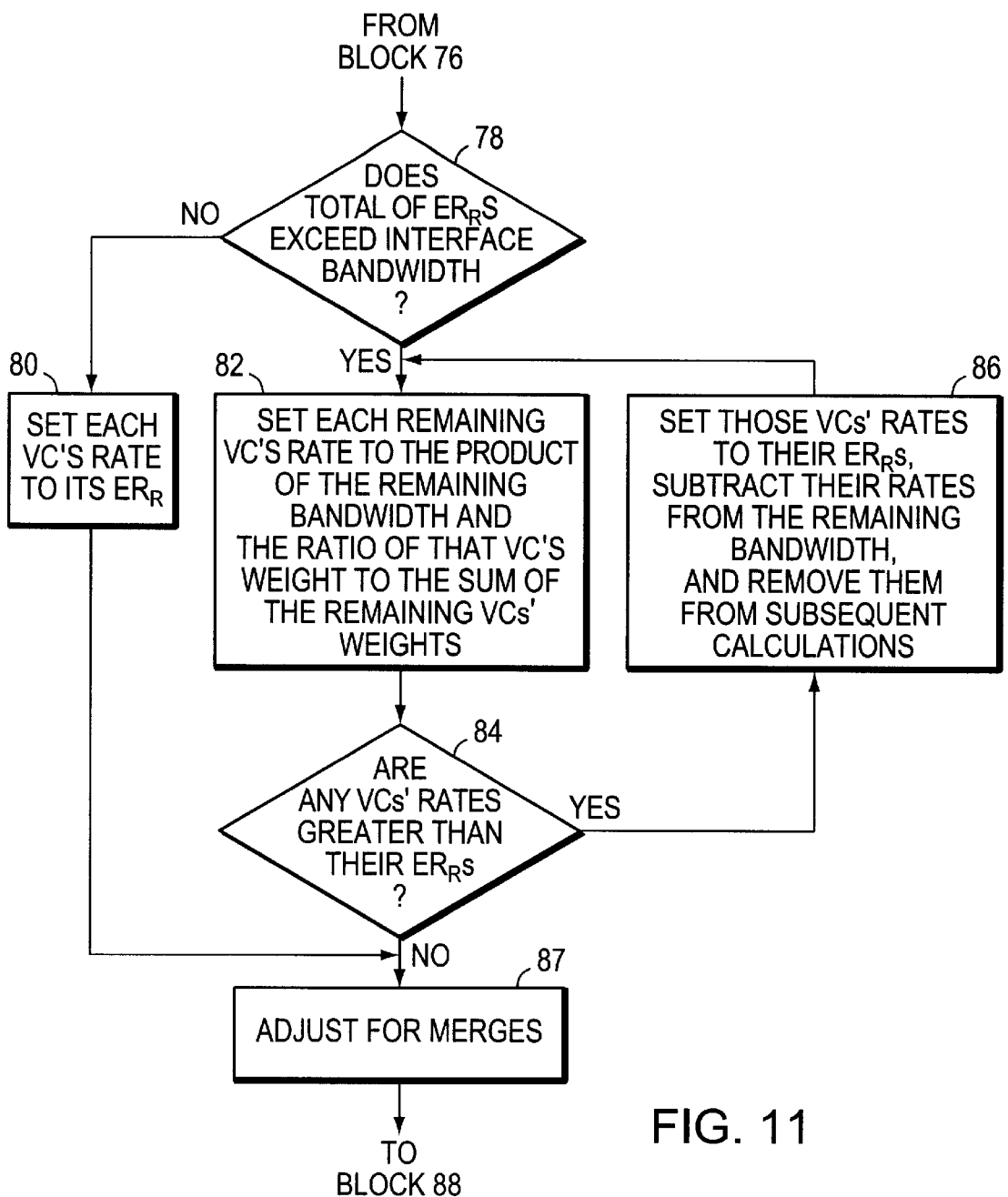
FIG. 11 is a flow chart illustrating the procedure that a router uses to determine the rates at which to forward different virtual channels' cells.

FIGS. 10 and 11 depict the routine that a router uses for this purpose. As FIG. 10's blocks 74 and 76 indicate, the interface responds to receipt of a proposed explicit rate in a reverse resource-management cell by updating the rates for all of its virtual channels in a manner that FIG. 11 depicts. If the sum of that requested explicit rate and those of all other virtual channels that the interface handles does not exceed the interface's nominal total link rate, then the rate at which it sends cells into that virtual channel is the explicit rate that the received resource-management cell contains, as FIG. 11's blocks 78 and 80 indicate. (Recall that the nominal rate $R_{TOT}$ may be greater or less than the interface's actual physical bandwidth if the common queue is nearly empty or full.) Otherwise, the interface allocates bandwidth in accordance with the virtual channels' respective "weights." Specifically, each virtual channel's rate is set equal to the product of the total bandwidth and the ratio of that virtual channel's weight, which is assigned in a manner that will be described presently, to the sum of all the virtual channels' similarly assigned weights, as block 82 indicates.

Now, the result of that operation could be that the rates for one or more of the virtual channels are greater than their requested rates. Any such virtual channel is simply assigned its requested rate, and the process is then repeated with those virtual channels removed from consideration, as blocks 84 and 86 indicate. This loop continues until no calculated rates exceed requested rates. For non-merging switches, this completes the determination of the rates that the switch allocates to its various virtual channels. If merges occur, though, the switch additionally performs block 87's merge-adjustment step.

To understand the merge-adjustment step, it is important to appreciate that the rates with which FIG. 11's previous steps deal apply to downstream channels, i.e., to the collection of virtual channels that remain after any merge. But the purpose of the FIG. 10 operation, of which FIG. 11's operation is a part, is to set the rate for an upstream virtual channel, which may be merged with another to feed a downstream channel. The block 87 step divides the rate determined for any merge-resulting downstream path into rates for its constituent upstream paths.

Different implementations may use different approaches to this division. One approach is to divide the downstream rate in accordance with the constituent upstream channels' weights. This approach can be used uniformly. Alternatively, it can be used only when, say, ER values previously recorded from those paths' forward-directed resource-management cells do not add up to that of their merged channel's reverse-directed resource-management cell. In cases where the merged channel's reverse ER value equals the sum of the constituent channels' forward ER values, those forward values can be used instead. Other division approaches may also be used.

In the illustrated embodiment, the rates thus determined are not necessarily those that the router places in the reverse resource-management cell that it sends to its up-stream-neighbor router. Specifically, although a source switch endeavors to send a given channel's cells at the rate that downstream switches have allocated to it, some disparity between the downstream switch's reception and transmission rates can nonetheless result, and the channel's private queue may become nearly empty or full. If that happens, the interface may place in the reverse resource-management cell a rate slightly greater or less than the rate that it has actually allocated to that channel. As FIG. 10's blocks 88 and 90 indicate, for example, it may set the outgoing reverse resource-management cell's ER field to 1.05 times the allocated transmission rate if the channel's queue is nearly empty. As blocks 92 and 94 indicate, the interface may similarly set the ER field to 0.95 times the intended transmission rate if that channel's private queue is becoming too full. Otherwise, as block 96 indicates, the explicit rate is set to the intended transmission rate, and the interface sends its upstream-neighbor switch a reverse resource-management cell containing that rate in its ER field, as block 98 indicates.

We now turn to the way in which the various switches assign the weights that they use in allocating resources to the virtual channels that they support. In the illustrated embodiment, the ATM switches are employed to implement tag-switching routers. To communicate with each other about routing matters, the routers use the IP protocol suite, sending IP datagrams as the payloads of ATM frames. When a router needs to forward a given destination's cells to a neighbor router, i.e., when that neighbor router is to be the next hop for such cells, the router asks its downstream neighbor for a VCI value to use for such cells by employing the Tag-Distribution Protocol ("TDP") described in the above-identified Rekhter et al. application.

Figure 12:
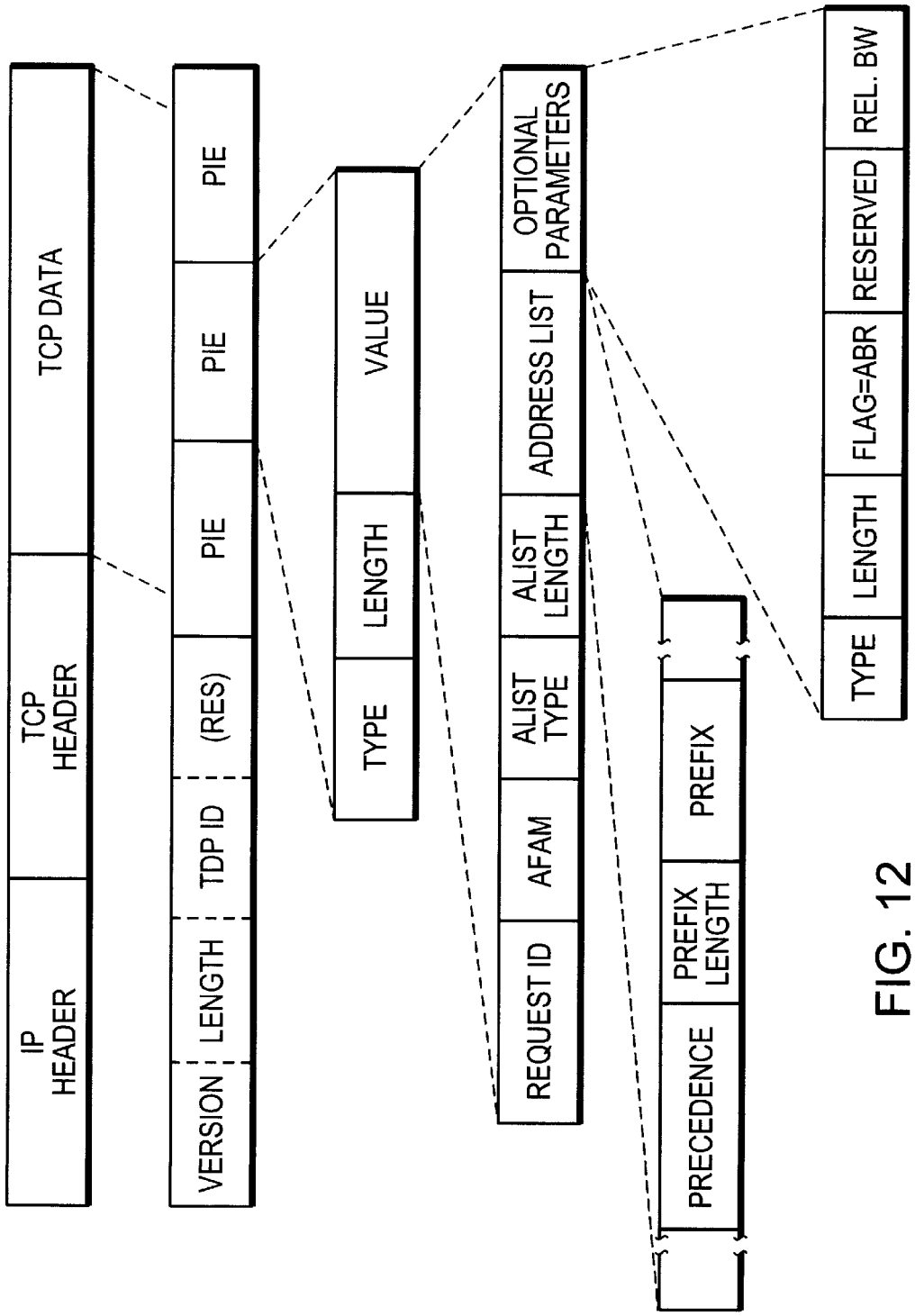
FIG. 12 is a diagram of the message format that label-switching routers use to distribute relative weights employed in calculating different channels' cell-transmission rates.

FIG. 12 depicts a message used for that purpose. FIG. 12's top row represents an IP datagram whose payload is a Transmission Control Protocol ("TCP") segment. As those skilled in the art recognize, network nodes employ such segments to ensure reliable information delivery. Whereas there is nothing in the Internet Protocol itself to ensure that IP datagrams will reach their destinations—IP routers are free to discard packets if they are overwhelmed—the TCP header includes information that enables a TCP process at the receiving host to place information in its proper sequence and arrange for missing information to be re-sent. The output of this process is a data stream consisting of the concatenation of various TCP-segment payloads. In this case, that data stream is delivered to a TDP process, which interprets it as messages whose format FIG. 12's second row depicts.

A TDP protocol data unit ("PDU") begins with a fixed-length four-field header. The header's two-byte version field gives the number of the TDP version that the sender is using. The two-byte length field gives the length in bytes of the remainder of the PDU; i.e., it gives the total PDU length minus four.

TDP communications occur in sessions, of which a given router can be conducting more than one at a time. The first four bytes of the six-byte TDP ID field encode an IP address assigned to the router that started the TDP session, and the TDP ID field's last two bytes identify the particular session. A two-byte field reserved for further enhancements completes the header, and the remainder of the PDU comprises one or more protocol information elements (PIEs), which take the type-length-value format that FIG. 12's third row illustrates.

Each PIE's type field specifies its purpose, while its length field gives the length of its value field. Various PIE types have housekeeping purposes, such as instituting a TDP session between two routers, negotiating protocol versions, providing error notifications, and keeping the session alive. (If a router does not receive a same-session communication within a certain time-out period, it ends the session and discards the VCIs installed during the session.) Other PIE types are more directly involved with label (or, in this case, VCI) distribution, which is the protocol's main purpose, and various of these can be used in distributing relative weights. One of these is the TDP_PIE_REQUEST_BIND type, for which the type field's contents are $0320_{16}$. A first label-switching router sends a neighbor router such a PIE type to request that the neighbor send the first router a label (or VCI) to be used when the first router sends the neighbor a packet having a particular destination-address prefix.

FIG. 12's fourth row depicts this PIE type's value field. The value field's request-ID subfield contains a locally significant number that another router's response to this PIE will include to enable the requesting router to match the response with the request. The AFAM (Address Family) field is set to $0001_{16}$, indicating that the address prefixes contained in the PIE's binding list are intended to be interpreted as IP version 4 (IPv4). The ALIST TYPE and ALIST LENGTH fields give the format and length of an address-list field. If the ALIST TYPE field's value is $0001_{16}$, the address-list field uses (precedence, prefix length, prefix) triples to supply the prefixes for which the requesting router is requesting labels, as FIG. 12's fifth row illustrates.

As FIG. 12's fourth row indicates, the TDP_PIE_REQUEST_BIND PIE provides an optional-parameters field, which includes zero or more type-length-value fields. To specify a weight for the routes in the PIE's address list, the requesting router can include such a field of a type whose format is, say, like the one (not documented in the above-mentioned Rekhter et al. application) that FIG. 12's sixth row depicts. The weights may be used in modes other than the available-bit-rate mode described above, so the value field begins with a flag that specifies the available-bit-rate mode. It may be prudent to follow this with a reserved field to facilitate subsequent protocol enhancements, and the weight, preferably specified by an integer with a large range (e.g. $1-2_{64}$), occupies the last, relative-bandwidth field.

The weight that an ingress router such as FIG. 4's router 10 places in the request message is normally set in accordance with a configured policy. For example, the ingress router may be so configured that any routes falling within certain address ranges receive associated weights. But a transit router such as router 24 more typically specifies a weight that it has received from an upstream router. For instance, if FIG. 4's router 10 includes a weight $w_1$ in the TDP_PIE_REQUEST_BIND PIE that it uses to request from router 24 a VCI value for cells destined for router 32, then router 24 will ordinarily use the same weight in requesting a VCI value for the same destination from router 32.

An exception to this rule occurs in the case of a merge. Suppose that router 32 receives a request to bind a label to router 30's address not only from router 24 but also from router 40. Suppose further that router 24's request specifies a weight $w_2$. If router 32 merges the two flows, requesting only a single label for that destination, it specifies a weight $w_1+w_2$ in its bind request to router 30.

Although we prefer to practice the present invention in ATM switches that implement label-switching routers, a review of the foregoing disclosure reveals that this is not a requirement. Specifically, it is unnecessary for the ATM frames to contain the combination of MPLS shim and IP datagram that FIG. 7's fourth row depicts. Indeed, they would not need to carry IP datagrams at all. Although the illustrated embodiment employs a weight-based ABR mechanism, moreover, those skilled in the art will recognize that a more-conventional ABR bandwidth-allocation approach could be used to implement the present invention's teachings.

Indeed, the present invention's teachings are applicable beyond ATM networks. For example, commonly assigned U.S. patent application Ser. No. 09/201,337, which was filed on Nov. 30, 1998, by Davie et al. for Congestion Avoidance on Communications Networks and is hereby incorporated by reference, describes the use of resource-management messages in label-switching routers that are not implemented in ATM switches. Those skilled in the art will recognize that the merging approach described here is also applicable to such routers.

In short, the present invention can be implemented in a wide range of embodiments and constitutes a significant advance in the art.

What is claimed is:

1. A communications network comprising:
   A) a downstream ATM switch;
   B) a plurality of upstream ATM switches that concurrently with each other transmit constituent-channel-VCI-value ATM data and forward-directed resource-management cells in which the upstream ATM switches have inserted respective constituent-channel VCL values associated with a common composite-channel VCI value; and
   C) a merging ATM switch that receives the constituent-channel-VCI-value data and forward directed resource-management cells directly from the upstream ATM switches and responds to each of the received constituent-channel-VCI-value forward-directed resource-management cells by:
      i) sending the one of said plurality of upstream ATM switches from which it received that constituent-channel-VCI-value forward-directed resource-management cell a corresponding constituent-channel-VCI-value reverse-directed resource-management cell containing the same constituent-channel VCI value; and
      ii) sending the downstream ATM switch a corresponding composite-channel-VCI-value forward-directed resource-management cell containing the composite-channel VCI value.

2. A communications network as defined in claim 1 wherein the corresponding composite-channel-VCI-value forward-directed resource-management cell sent by the merging ATM switch to the downstream ATM switch contains an explicit-rate value that at least in some situations equals the sum of explicit-rate values contained in the constituent-channel-VCI-value forward-directed resource-management cells from the plurality of upstream ATM switches.

3. A communications network as defined in claim 1 wherein:
   A) the merging ATM switch receives from the downstream switch composite-channel-VCI-value reverse-directed resource-management cells containing received explicit-rate values; and
   B) the sum of the explicit-rate values respectively sent to the upstream ATM switches equals in at least some situations the received explicit-rate value contained in the composite-channel-VCI-value reverse-directed resource-management cell last received from the downstream switch.

4. A communications network as defined in claim 3 wherein the corresponding composite-channel-VCI-value forward-directed resource-management cell sent by the merging ATM switch to the downstream ATM switch contains an explicit-rate value that at least in some situations equals the sum of explicit-rate values contained in the constituent-channel-VCI-value forward-directed resource-management cells from the plurality of upstream ATM switches.

5. An ATM switch comprising:
   A) a downstream port;
   B) a plurality of upstream ports at which it receives constituent-channel-VCI-value data and forward-directed resource-management cells containing respective constituent-channel VCI values associated with a common composite-channel VCI value; and
   C) circuitry that responds to each of the received constituent-channel-VCI-value forward-directed resource-management cells by:
      i) sending from the one of said plurality of upstream ports at which it received that constituent-channel-VCI-value forward-directed resource-management cell a corresponding constituent-channel-VCI-value reverse-directed resource management cell containing the same constituent-channel VCI value; and
      ii) sending from the downstream port a corresponding composite-channel-VCI-value forward-directed resource-management cell containing the composite-channel VCI value.

6. An ATM switch as defined in claim 5 wherein the corresponding composite-channel-VCI-value forward-directed resource-management cell sent by the merging ATM switch from its downstream port contains an explicit-rate value equal to the sum of explicit-rate values contained in the constituent-channel-VCI-value forward-directed resource-management cells received at the plurality of upstream ports.

7. An ATM switch as defined in claim 5 wherein:
   A) the merging ATM switch receives at its downstream port composite-channel-VCI-value reverse-directed resource-management cells containing received explicit-rate values; and
   B) the sum of the explicit-rate values respectively sent from the upstream ports equals in at least some situations the received explicit-rate value contained in the composite-channel-VCI-value reverse-directed resource-management cell last received at the downstream port.

8. An ATM switch as defined in claim 7 wherein the corresponding composite-channel-VCI-value forward-directed resource-management cell sent by the merging ATM switch from its downstream port contains an explicit-rate value equal to the sum of explicit-rate values contained in the constituent-channel-VCI-value forward-directed resource-management cells received at the plurality of upstream ports.

9. For operating a communications network, a method comprising:
   A) receiving at a merging ATM switch concurrently from a plurality of upstream ATM switches constituent-channel-VCI-value ATM data and forward-directed resource-management cells in which the upstream ATM switches have inserted respective constituent-channel VCI values associated with a common composite-channel VCI value; and
   B) responding to each of the received constituent-channel-VCI-value forward-directed resource-management cells by:
      i) sending from the merging ATM switch to the one of said plurality of upstream ATM switches from which the merging ATM switch received that constituent-channel-VCI-value forward-directed resource-management cell a corresponding constituent-channel-VCI-value reverse-directed resource management cell containing the same constituent-channel VCI value; and
      ii) sending from the merging ATM switch to a downstream ATM switch a corresponding composite-channel-VCI-value forward-directed resource-management cell containing the composite-channel VCI value.

10. A method as defined in claim 9 wherein the corresponding composite-channel-VCI-value forward-directed resource-management cell sent by the merging ATM switch to the downstream ATM switch contains an explicit-rate value equal to the sum of explicit-rate values contained in the constituent-channel-VCI-value forward-directed resource-management cells from the plurality of upstream ATM switches.

11. A method as defined in claim 9 further comprising:
   A) the method further comprises receiving at the merging ATM switch from the downstream ATM switch composite-channel-VCI-value reverse-directed resource-management cells containing received explicit-rate values; and
   B) the sum of the explicit-rate values respectively sent to the upstream ATM switches equals in at least some situations the received explicit-rate value contained in the composite-channel-VCI-value reverse-directed resource-management cell last received from the downstream switch.

12. A method as defined in claim 11 wherein the corresponding composite-channel-VCI-value forward-directed resource-management cell sent by the merging ATM switch to the downstream ATM switch contains an explicit-rate value equal to the sum of explicit-rate values contained in the constituent-channel-VCI-value forward-directed resource-management cells from the plurality of upstream ATM switches.

13. A storage medium containing instructions readable by a computer system to configure the computer system as an ATM switch comprising:
   A) a downstream port;
   B) a plurality of upstream ports ,it which it receives constituent-channel-VCI-value data and forward-directed resource-management cells; and
   C) circuitry that responds to each of the received constituent-channel-VCI-value forward-directed resource-management cells by:
      i) sending from the one of said plurality of upstream ports at which it received that constituent-channel-VCI-value forward-directed resource-management cell a corresponding constituent-channel-VCI-value reverse-directed resource-management cell containing the same constituent-channel VCI value;, and
      ii) sending from the downstream port a corresponding composite-channel-VCI-value forward-directed resource-management cell containing the composite-channel VCI value.

14. A storage medium as defined in claim 13 wherein the corresponding composite-channel-VCI-value forward-directed resource-management cell sent by the merging ATM switch from its downstream port contains an explicit-rate value equal to the sum of explicit-rate values contained in the constituent-channel-VCI-value forward-directed resource-management cells received at the plurality of upstream ports.

15. A storage medium as defined in claim 13 wherein:
A) the merging ATM switch receives at its downstream port composite-channel-VCI-value reverse-directed resource-management cells containing received explicit-rate values; and
B) the sum of the explicit-rate values respectively sent to the upstream ATM switches equals in at least some situations the received explicit-rate value contained in that composite-channel-VCI-value reverse-directed resource-management cell last received from the downstream switch.

16. A storage medium as defined in claim 15 wherein the corresponding composite-channel-VCI-value forward-directed resource-management cell sent by the merging ATM switch from its downstream port contains an explicit-rate value equal to the sum of explicit-rate values contained in the constituent-channel-VCI-value forward-directed resource-management cells received at the plurality of upstream ports.

17. A signal representing a sequence of instructions that, when executed by a computer system, configures the computer system to operate as an ATM switch comprising:
A) a downstream port;
B) a plurality of upstream ports at which it receives constituent-channel-VCI-value data and forward-directed resource-management calls containing respective constituent-channel VCI values associated with a common composite-channel VCI value; and
C) circuitry that responds to each of the received constituent-channel-VCI-value forward-directed resource-management cells by:
    i) sending from the one of said plurality of upstream ports at which it received that constituent-channel-VCI-value forward-directed resource-management cell a corresponding constituent-channel-VCI-value, reverse-directed resource-management cell containing the same constituent-channel VCI value; and
    ii) sending from the downstream port a corresponding composite-channel-VCI-value forward-directed resource-management cell containing to composite-channel VCI value.

18. A signal as defined in claim 17 wherein the corresponding composite-channel-VCI-value forward-directed resource-management cell sent by the merging ATM switch from its downstream port contains an explicit-rate value equal to the sum of explicit-rate values contained in the constituent-channel-VCI-value forward-directed resource-management cells received at the plurality of upstream ports.

19. A signal as defined in claim 17 wherein:
A) the merging ATM switch receives at its downstream port composite-channel-VCI-value reverse-directed resource-management cells containing received explicit-rate values; and
B) the sum of the explicit-rate values respectively sent to the upstream ATM switches equals in at least some situations the received explicit-rate value contained in the composite-channel-VCI-value reverse-directed resource-management cell last received from the downstream switch.

20. A signal as defined in claim 19 wherein the corresponding composite-channel-VCI-value forward-directed resource-management cell sent by the merging ATM switch from its downstream port contains an explicit-rate value equal to the sum of explicit-rate values contained in the constituent-channel-VCI-value forward-directed resource-management cells received at the plurality of upstream ports.

21. A communications network comprising:
A) a downstream label-switching router;
B) a plurality of upstream label-switching routers that concurrently with each other send constituent-channel-label-value data packets and constituent-channel-label-value forward-directed resource-management messages in which the upstream label-switching routers have inserted respective constituent-channel label values associated with a common composite-channel label value; and
C) a merging label-switching router that receives the constituent-channel-label-value data and forward-directed resource-management messages directly from the upstream label-switching routers and responds to each of the received constituent-channel-label-value forward-directed resource-management messages by:
    i) sending the one of said plurality of upstream label-switching routers from which it received that constituent-channel-label-value forward-directed resource-management message a corresponding constituent-channel-label-value reverse-directed resource-management message containing the same constituent-channel label value; and
    ii) sending the downstream label-switching router a corresponding composite-channel-label-value forward-directed resource-management message containing the composite-channel label value.

22. A label-switching router comprising:
A) a downstream port,
B) a plurality of upstream ports at which it receives constituent-channel-label-value data packets and constituent-channel-label-value forward-directed resource-management messages containing respective constituent-channel label values associated with a common composite-channel label value; and
C) circuitry that responds to each of the received constituent-channel-label-value forward-directed resource-management messages by:
    i) sending from the one of said plurality of upstream ports at which it received that constituent-channel-label-value forward-directed resource management message a corresponding constituent-channel-label-value reverse-directed resource-management message containing the same constituent-channel label value; and
    ii) sending from the downstream port a corresponding composite-channel-label-value forward-directed resource-management message containing the composite-channel label value.

23. For operating a communications network, a method comprising:
A) receiving at a merging label-switching router concurrently from a plurality of upstream label-switching routers constituent-channel-label-value data packets and constituent-channel-label-value forward-directed resource-management messages in which the upstream label-switching routers have inserted respective constituent-channel label values associated with a common composite-channel label value; and
B) responding to each of the received constituent-channel-label-value forward-directed resource-management cells by:

i) sending from the merging label-switching router to the one of said plurality of upstream label-switching routers from which the merging label-switching router received that constituent-channel-label-value forward-directed resource management cell a corresponding constituent-channel-label-value resource-directed resource-management cell containing the same constituent-channel VCI value; and ii) sending from the merging label-switching router to a downstream label-switching router a corresponding composite-channel-VCI-value forward-directed resource-management cell containing the composite-channel VCI value.

* * * * *